United States Patent [19]

Dubow

[11] 4,289,805

[45] Sep. 15, 1981

[54] METHOD FOR SEALING POROSITY LEAKS IN PNEUMATIC TIRES

[75] Inventor: Jerome Dubow, North Wales, Pa.

[73] Assignee: Stop-A-Flat Corporation, Huntingdon Valley, Pa.

[21] Appl. No.: 60,967

[22] Filed: Jul. 26, 1979

[51] Int. Cl.³ .................. B29H 9/02; B32B 25/02; B32B 25/04; B05D 7/22
[52] U.S. Cl. ............................. 427/140; 427/231
[58] Field of Search ........................... 427/140, 231

[56] References Cited

U.S. PATENT DOCUMENTS

| | | | |
|---|---|---|---|
| 1,233,753 | 7/1917 | Cline et al. | 106/33 |
| 1,633,500 | 6/1927 | Serchi | 106/33 |
| 1,690,051 | 10/1928 | Board | 106/33 |
| 1,896,611 | 2/1933 | Cross | 106/33 |
| 2,002,112 | 5/1935 | French et al. | 166/166 |
| 2,055,797 | 9/1936 | Loomis | 106/33 X |
| 2,074,926 | 3/1937 | Kruse | 106/33 X |
| 2,120,379 | 6/1938 | Taylor et al. | 106/33 X |
| 2,286,963 | 6/1942 | Houser et al. | 106/33 |
| 2,347,925 | 5/1944 | Owens | 106/33 |
| 2,357,650 | 9/1944 | Hall | 106/33 X |
| 2,469,039 | 5/1949 | Hopping | 106/33 |
| 2,606,125 | 8/1952 | Covelli | 106/33 |
| 3,352,696 | 11/1967 | Wallace | 106/33 |
| 3,361,606 | 1/1968 | Wolfson | 106/33X |
| 3,407,082 | 10/1968 | Mineo | 106/33 |
| 3,449,155 | 6/1969 | Fuller et al. | 427/231 |
| 3,483,053 | 12/1969 | Miserentino et al. | 428/912 X |
| 3,881,943 | 5/1975 | Fuller | 106/33 |
| 4,068,027 | 1/1978 | Van Ornum | 427/231 X |
| 4,137,206 | 1/1979 | Kent | 106/33 X |

*Primary Examiner*—James R. Hoffman
*Attorney, Agent, or Firm*—Weiser, Stapler & Spivak

[57] ABSTRACT

The method of sealing microscopic holes formed in tires and similar articles during the manufacturing process including the steps of reducing the pressure within the tire to substantially atmospheric pressure, introducing an emulsion of butyl latex combined with natural fibers into the interior void defined by the tire, inflating the tire with air to super atmospheric pressure, rotating the tire to contact the microscopic openings with portions of the emulsion and then solidifying the portions of the emulsion within the openings to effect closure.

2 Claims, No Drawings

METHOD FOR SEALING POROSITY LEAKS IN PNEUMATIC TIRES

BACKGROUND OF THE INVENTION

The present invention relates generally to the field of sealing leaks within pneumatic tires, and more particularly, is directed to a method of automatically sealing such leaks. The method of the present invention includes the steps of introducing an emulsion of butyl latex combined with natural fibers into the interior space defined by a tire, then inflating the tire and rotating the tire to cause portions of the emulsion to flow into and seal the openings.

During the manufacturing process, most pneumatic tires are formed in either a clam shell type of mold or a radially opening and closing type mold. In all cases, the tires are molded under conditions of extremely high pressures and extremely high temperatures. It has been found that the intense heat required in the molding process frequently causes microscopic pin holes to form in the tire during the molding process. These pin holes cause the tire to slowly lose air, thereby resulting in lower than normal air pressures within the tire after passage of a period of time.

When the usual tire with the formed pin holes is in use, air from within the interior space seeps through the microscopic holes due to the internal air pressure. If any of the holes communicate with the tire exterior, the air within the tire can reach the outside to thereby cause the tire to deflate slowly. If the air passing into the microscopic holes does not find microscopic channels to reach the outside, the internal air will progress within the body of the tire itself to the full extent permitted by the configuration and length of the microscopic holes or channels. On occasion, this movement of internal air under pressure can cause belt shifting and actual ply separation.

Prior workers in the art have developed numerous compositions for introduction into the interior space defined within tires for tire sealing purposes. For example, U.S. Pat. No. 3,449,155 describes the use of an aqueous solution of a boric acid salt and an aliphatic acid or salt thereof including glycolic acid. U.S. Pat. No. 3,352,696 illustrates the use of an aqueous composition of polyhydric alcohol, asbestos fibers, gum arabic and gum karaya together with a viscous cellulose ether and an alum compound. In U.S. Pat. No. 1,633,500, an aqueous solution of dextrine is utilized for sealing purposes. Other prior workers in the art have employed ground linseed meal (U.S. Pat. No. 2,347,925), a gelantinized starch suspension (U.S. Pat. No. 2,286,963) and an aqueous mixture of an agglutinant such as acetate and fillers (U.S. Pat. No. 2,074,926).

Experience has shown that the compositions and materials utilized by the prior workers have on many occasions proved defective in that the sealing materials applied frequently would "ball" when in use and would thus not perform the desired sealing function. Additionally, other compositions employed relatively large size fibers of such dimensions that orifice clogging could occur to thereby interfere with the pressurized air filling capabilities of the tire. Despite the interest of the prior workers in this particular field to develop a fully acceptable sealing product, the need remains for a reliable, automatic sealer and method for closing porosity leaks and other leaks in pneumatic tires.

SUMMARY OF THE INVENTION

The present invention relates generally to the field of tire sealing methods and compositions therefore, and more particularly, is directed to a method for sealing porosity leaks in pneumatic tires and similar articles which are designed for inflation by air under super atmospheric pressure.

In accordance with the method of the present invention, a conventional pneumatic, tubeless tire is mounted upon a rim of suitable size and the rim is affixed to the vehicle in well known manner. Prior to inflating the tire, a composition comprising an aqueous emulsion of butyl latex combined with natural fibers is introduced into the interior space defined between the tire sidewalls and the wheel in sufficient quantities to effect sealing during the life of the tire. It is usual to introduce the tire sealing emulsion through the air inlet opening.

After the butyl latex emulsion has been interiorly placed, the tire is then inflated to a desired super atmospheric pressure, for example, between 28 psi and 32 psi. The vehicle is then driven to rotate the tire whereby the butyl latex liquid spreads a smooth, even film over the interior surfaces of the tire as a result of the centrifugal forces generated when the tire is rotated over the ground surface.

In the event the tire body contains microscopic pin holes caused during the manufacturing processes, then air escaping through the pin holes, will carry portions of the butyl latex emulsion to the pin holes which portions will seal the same to prevent air leakage therethrough. In the event of the presence of pin holes within the tire body, the movement of air therethrough from the tire interior towards the exterior will cause a suction effect to thus attract portions of the butyl latex emulsion to cause automatic sealing to occur. Continued operation of the vehicle will create or develop external tire heat due to frictional contact with the road surface. The frictional heat will act to dry out the butyl latex within the microscopic holes to thereby form a permanent seal and prevent slow leakage.

It is noteworthy that once the aqueous emulsion of butyl latex combined with natural fibers has been introduced within the interior space defined by the tire construction, and after any microscopic pin holes that may be present have been sealed, centrifugal forces will continue to spread a smooth film of the emulsion over the interior tire surfaces. Accordingly, should the tire be punctured from without, such as by running over a nail, portions of the same butyl latex emulsion initially employed to seal the microscopic pin holes caused during manufacturing will remain to effect automatic sealing of larger holes caused by tire punctures.

In the preferred embodiment, a sealing agent such as butyl latex is preferably employed in an aqueous solution. Fibers, such as natural asbestos fibers can be utilized as a matrix and together with the butyl latex, solidify and form an interior seal or patch over all air leaks in the tire body. If desired, a quantity of ethylene glycol can also be employed in the emulsion to act as an antifreeze and as a suspension agent for the asbestos fibers. The emulsion of butyl latex including the asbestos fibers and ethylene glycol is formed into an aqueous solution prior to introduction interiorly within the tire. In some instances, it is also desirable to employ a small amount of a bacteriacide such as a mercury compound to prevent spoilage and to discourage bacteria growth.

In one embodiment of the invention, substantially equal amounts of asbestos fiber and butyl latex have been combined with water to form a 10% solution to produce an extremely satisfactory sealant. Once the sealant has been inserted into the tire through the existing air inlet valve, nothing more need be done to the tire, which will then be effectively sealed for the life of the tire.

It is therefore an object of the present invention to provide a novel method for sealing porosity leaks in pneumatic tires.

It is another object of the present invention to provide a novel method for sealing pneumatic tires including the step of inserting within the interior space defined by the tire an emulsion of butyl latex combined with natural fibers.

It is another object of the present invention to provide a novel method for sealing leaks in pneumatic tires comprising the steps of reducing the interior tire pressure to substantially atmospheric pressure, introducing an emulsion of butyl latex combined with natural fibers within the tire interior space, inflating the tire to suitable operating pressure and then rotating the tire and spreading the emulsion over the interior tire surfaces.

It is another object of the present invention to provide a novel method for sealing leaks in pneumatic tires comprising the steps of introducing an aqueous solution of butyl latex, natural fibers and ethylene glycol into the tire interior space, rotating the tire and directing portions of the aqueous solution into the tire openings, rotating the tire over a road surface to create frictional heat and utilizing the heat to dry the portion of the aqueous solution within the openings to provide a permanent seal.

It is another object of the present invention to provide a novel method for sealing porosity leaks in pneumatic tires that is simple in operation, inexpensive in application and troublefree when in use.

Other objects and a fuller understanding of the invention will be had by referring to the following description and claims of a preferred embodiment thereof.

DESCRIPTION OF THE PREFERRED EMBODIMENT OF THE INVENTION

Although specific terms are used in the following description for the sake of clarity, these terms are intended to refer only to the particular features selected to illustrate the invention and are not intended to define or limit the scope of the invention.

The method of the present invention includes combining an emulsion of butyl latex with natural fibers such as asbestos fibers. A quantity of ethylene glycol can be introduced to act as an anti-freeze if so desired. One part by weight of the composition is then diluted with nine parts by weight of water to form an aqueous sealing solution.

In one example of the invention, a composition comprising 25% butyl latex, 25% natural fibers and 50% water by weight was mixed to form an aqueous mixture. One part of the mixture was mixed with nine parts water to form an acceptable sealing solution. At least about 1.5% by weight of butyl latex in the sealing solution is required to provide an affective sealant against the gradual loss of air through porosity leaks in pneumatic tires. Between about 1.7% and 5% by weight of butyl latex in the sealing solution is preferred for general applications. Concentrations above about 5% by weight generally afford no greater sealing advantages and accordingly, the increase in cost cannot be economically justified.

At least about 1% by weight of natural fiber, which preferably is in the form of asbestos fibers, is required to build up a suitable matrix to provide effective pneumatic tire sealing. Between about 1.5% and 4% by weight of natural fibers in the sealing solution is preferred for general applications. Concentrations of natural fibers in the sealing solution above 9% by weight have a clogging effect and interfere with the sealing function of the butyl latex.

The sealing solution can be introduced into the interior space or chamber defined by the tire sidewalls and the rim upon which the tire was mounted by introducing the sealing solution through the usual air inlet valve incorporated in the tire assembly. Preferably, any air at pressures above atmospheric pressure contained within the tire interior space is first relieved through the air valve opening to equalize air pressures both within and without the tire. With the interior chamber pressure at substantially atmospheric pressure, a sufficient quantity of the sealing solution can be inserted into the interior space. Depending upon the size of the tire being sealed, in most instances, a quantity of sealing solution between 3 ounces and 6 ounces will prove satisfactory. In the case of large vehicle tires, for example sizes 18–19.5 and 18–22.5, the introduction of as much as 42 ounces of sealing solution has been found desirable to achieve the desired sealing results.

Once the seaing solution has been introduced into the interior tire space or chamber, the tire is then inflated in usual manner to operating pressures, for example, between 28 psi and 32 psi and the tire can be affixed to a vehicle for vehicle operation. With the reinflated tire in place, the vehicle is then operated over the usual road surfaces to cause tire rotation and the spread of the sealing solution smoothly over the interior tire surfaces. Centrifugal forces generated by the tire rotation spreads the sealing solution to form a smooth, even film over the interior surfaces of the tire. It is noteworthy that the sealing solution is quite watery and not sticky in view of the quantity of water employed and the solution will not stick to the sides of the tire. Accordingly, the application of the sealing solution within the tire interior will not adversely effect the balance of the tire. Rather, the smooth even film will actually aid in the dynamic balancing of the tire.

Once the sealing solution has been introduced within the tire, any defects tending to cause air movement through the tire sidewalls, such as porosity leaks, will attract the butyl latex and fibers to the defect whereby a combination of butyl latex and natural fiber will fill the opening. The filling by the sealing solution immediately stops any air leakage through the opening or defect.

Continued operation of the vehicle over the road surface will cause the frictional heat to be developed and the frictional heat thus generated acts to dry out the butyl latex within the opening or openings to thereby form a permanent seal by acting from within the tire chamber.

If desired, known mercury compounds in small quantities can be added to the sealing solution to prevent spoilage and to discourage bacteria growth within the tire interior chamber. It should be noted however that any such bactericide will not aid in the sealing function of the sealing solution nor will it detract in any manner from efficient sealing.

In the event that a large opening might occur through the tire body during use, for example, a puncture opening caused by a nail or the like, the same sealing solution already present within the tire interior which had been introduced to seal microscopic openings caused during the tire manufacturing process will still be available for the additional sealing function. Accordingly, the movement of interior air to escape through the new puncture opening will draw a combination of asbestos fibers and butyl latex to the puncture opening, wherein the butyl latex will solidify and in combination with the asbestos fibers, will automatically form a matrix patch to seal the opening. This process would be similar in nature to a cold vulcanization of the tire defect.

Although the present invention has been described with reference to the particular embodiments herein set forth, it is understood that the present disclosure has been made only by way of example and that numerous changes in the details of composition may be resorted to without departing from the spirit and scope of the invention. Thus, the scope of the invention should not be limited by the foregoing specification, but rather only by the scope of the claims appended hereto.

What is claimed is:

1. A method for sealing porosity openings in a pneumatic tire having an interior chamber which comprises the steps of introducing into the interior tire chamber an aqueous sealing solution containing a butyl latex emulsion and natural fibers;

inflating the tire;

rotating the inflated tire and forming a film of the sealing solution over the interior chamber;

flowing portions of the sealing solution into the porosity openings;

rotating the tire over a surface and creating frictional heat; and utilizing the frictional heat to dry the portions of the sealing solution within the porosity openings and effecting sealing closure of the said openings.

2. The method of claim 1 and the further step of relieving any air at pressure above atmospheric pressure contained within the interior chamber to equalize air pressures both within and without the tire prior to introducing the said aqueous sealing solution.

* * * * *